United States Patent
Zhu (10) Patent No.: US 11,522,673 B2
(45) Date of Patent: Dec. 6, 2022

(54) METHOD AND DEVICE FOR BLOCKCHAIN FULL SHARDING BASED ON A P2P STORAGE NETWORK AND A MULTI-LAYER ARCHITECTURE

(71) Applicant: Sichuan Interstellar Roewe Technology Co, Ltd, Chengdu (CN)

(72) Inventor: Qizhong Zhu, Chengdu (CN)

(73) Assignee: Qizhong Zhu, Changzhou (CN)

( * ) Notice: Subject to any disclaimer, the term of this patent is extended or adjusted under 35 U.S.C. 154(b) by 57 days.

(21) Appl. No.: 17/135,947

(22) Filed: Dec. 28, 2020

(65) Prior Publication Data
US 2021/0203477 A1    Jul. 1, 2021

(30) Foreign Application Priority Data
Dec. 27, 2019  (CN) .......................... 201911380172.5

(51) Int. Cl.
| | | |
|---|---|---|
| *H04L 9/06* | (2006.01) | |
| *H04L 67/104* | (2022.01) | |
| *H04L 67/1097* | (2022.01) | |
| *H04L 9/00* | (2022.01) | |

(52) U.S. Cl.
CPC ........ *H04L 9/0618* (2013.01); *H04L 67/1044* (2013.01); *H04L 67/1097* (2013.01); *H04L 9/50* (2022.05)

(58) Field of Classification Search
CPC .............. H04L 9/0618; H04L 67/1044; H04L 67/1097; H04L 9/50
See application file for complete search history.

(56) References Cited

U.S. PATENT DOCUMENTS 10,795,857 B2 *  10/2020  Lin ..................... G06F 16/1734

FOREIGN PATENT DOCUMENTS

| WO | WO-2018217804 A1 * | 11/2018 | ......... H04L 12/1886 |
| WO | WO-2020113545 A1 * | 6/2020 | |

* cited by examiner

*Primary Examiner* — Arvin Eskandarnia
(74) *Attorney, Agent, or Firm* — Bayramoglu Law Offices LLC (57) ABSTRACT

A method for blockchain full sharding based on a P2P storage network and a multi-layer architecture is provided. The entire network blockchain nodes are divided into a shard chain, a relay chain and a beacon chain by means of network sharding, that is, shard cross-chain communication is realized by using a beacon-relay-shard three-layer architecture or an architecture with more than three layers, so that the network requirement of the nodes has a linear relationship with the total number of TPS of the network. A transaction is divided into a W primitive and a D primitive. The D primitives are grouped and hash values corresponding to the D primitives are calculated: the W primitive is executed on an initiator's shard, the D primitive is stored in the P2P storage network, and the hash value corresponding to the primitive is communicated across the chain, and finally executed on a receiver's shard.

16 Claims, 3 Drawing Sheets

FIG. 5

METHOD AND DEVICE FOR BLOCKCHAIN FULL SHARDING BASED ON A P2P STORAGE NETWORK AND A MULTI-LAYER ARCHITECTURE

CROSS REFERENCE TO THE RELATED APPLICATIONS

This application is based upon and claims priority to Chinese Patent Application No. 201911380172.5, filed on Dec. 27, 2019, the entire contents of which are incorporated herein by reference.

TECHNICAL FIELD

The present invention relates to the technical field of blockchain sharding, and more particularly, to a method and device for blockchain full sharding based on a peer-to-peer (P2P) storage network and a multi-layer architecture.

BACKGROUND

In the blockchain technology, data needs to be broadcast on the entire network before being packaged into blocks. With the growth of the network, there are more and more data and nodes in the blockchain, which typically consumes a substantial amount of time for data broadcasting. This greatly reduces the block generation performance of the same blockchain.

Consequently, blockchain sharding technology emerged. Sharding technology is an expansion technology of traditional concept based on dividing the database into several fragments. It divides the database into several fragments and places these fragments on different servers. In an underlying public chain system, transactions on the network will be divided into different fragments, which are composed of different nodes on the network. Therefore, only a small part of arriving transactions needs to be processed, and a large amount of verification work can be completed by processing in parallel with other nodes on the network.

Currently, the blockchain sharding technology mainly has the following two problems: (1) cross-chain transactions in shards have extremely high communication complexity and bandwidth requirements, and this bandwidth requirement has a quadratic relationship with the transactions per second (TPS) capability of the system, resulting in limited scalability of the current sharding technology; (2) state sharding is extremely difficult since it not only requires particular devices to store the data of a certain shard, but also requires the shards to be accessed and synchronized by any node in the network when appropriate.

The problem (2) in turn affects the problem (1), and eventually the communication bandwidth of the nodes in the current sharding technical solution quadratically increases with the number of shards. As a result, the shards either only run in an environment with excellent network conditions, or are limited in number, which severely restricts the scalability of the blockchain system.

SUMMARY

In order to solve the problem of low scalability in the existing blockchain sharding technology, an objective of the present invention is to provide a sharding method and device based on a P2P storage network, which solves the state sharding problem, makes the bandwidth requirement linearly related to the total number of transactions per second (TPS) of the network by using a three-layer architecture for sharding, reduces communication complexity and bandwidth requirements, and improves the scalability of sharding.

The present invention adopts the following technical solutions.

A method for blockchain full sharding based on a P2P storage network and a multi-layer architecture includes a cross-shard transaction packing phase and a cross-shard transaction unpacking phase.

The cross-shard transaction packing phase includes the following steps:

S101: performing network sharding on the entire network blockchain nodes according to an address to obtain a shard chain, a relay chain, and a beacon chain respectively, wherein the beacon chain is communicatively connected to a plurality of relay chains, the relay chain is communicatively connected to a plurality of shard chains, and the shard chain is communicatively connected to a plurality of blockchain nodes;

S102: decomposing a transaction T into two primitives to obtain T={W,D}, wherein the W primitive is digital asset deduction information of a payment account in the transaction, and the D primitive is digital asset addition information of a receiving account in the transaction;

S103: with respect to each shard chain, counting the D primitives corresponding to all the transactions T in each shard chain, and grouping all the D primitives in each shard chain; after the grouping is completed, obtaining a D primitive set ch corresponding to each group, storing the D primitive set ch corresponding to each group into the P2P storage network, and then calculating a hash set Hg corresponding to each D primitive set ch;

S104: with respect to each shard chain, when generating a shard block $B_s$, packing each hash set Hg into the shard block $B_s$ corresponding to each hash set Hg, and sending the shard block $B_s$ to all blockchain nodes in the shard chain and a relay chain to which the shard chain belongs; and S105: with respect to each relay chain, when generating a relay block $B_r$, according to all the received shard blocks $B_s$, integrating the hash sets Hg in all shard blocks $B_s$ according to all the relay chains to obtain a hash set Hr, packing the hash set Hr into the relay block $B_r$, storing the hash sets Hg in all the shard blocks $B_s$ into the P2P storage network, and then sending the relay block $B_r$ to the current relay chain and the beacon chain.

The cross-shard transaction unpacking phase includes the following steps:

S201: when the beacon chain generates a beacon block $B_b$, according to all the received relay blocks $B_r$, integrating the hash sets Hr in all the relay blocks $B_r$ according to all the relay chains to obtain a hash set Hs, packing the hash set Hs into the beacon block $B_b$, storing the hash sets Hr in all the relay blocks $B_r$ into the P2P storage network, and then sending the beacon block $B_b$ to the beacon chain and all relay chains;

S202: with respect to each relay chain, when generating a relay block $B_r'$, according to the hash set Hs in the received beacon block $B_b$, through data inference, regrouping and combining each D primitive set ch to obtain a D primitive set ch' belonging to the current relay chain and all hash values h' corresponding to the D primitive set ch', storing the D primitive set ch' into the P2P storage network, packing all the hash values h' into the relay block $B_r'$, and then sending the relay block $B_r'$ to all shard chains managed by the current relay chain; and S203: with respect to each shard chain, when generating a shard block $B_s'$, reading the D primitive set ch' that needs to be executed by the current shard chain in the P2P storage network according to the hash values h' in the received relay block $B_r'$, to obtain the D primitive, and then updating a shard state according to the D primitive.

Preferably, a condition for grouping all the D primitives in each shard chain in step S103 includes: according to a relay chain corresponding to the receiving account in the D primitive, grouping the D primitives corresponding to the receiving accounts belonging to the same relay chain into one group.

Preferably, before step S104, the method further includes the following steps:

with respect to each shard chain, updating a state of each shard chain according to the W primitives in each shard chain, and obtaining a state Merkle tree root $R_{shard}$ corresponding to each shard chain.

Preferably, in step S104, the state Merkle tree root $R_{shard}$ corresponding to each shard chain is packed into a shard block $B_s$ corresponding to the state Merkle tree root $R_{shard}$, and the shard block $B_s$ together with the hash set Hg, after being validated by a consensus, are sent to all the blockchain nodes in the shard chain and the relay chain to which the shard chain belongs.

Preferably, step S105 further includes the following steps:

S105a, with respect to each relay chain, when generating the relay block $B_r$, recording all the shard blocks $B_s$ processed by the relay block $B_r$ to form a first block record {HB}; and S105b, packing the first block record {HB} and the hash set Hr into the relay block $B_r$ corresponding to the relay chain, and after the relay block $B_r$ is validated by a consensus, sending the relay block $B_r$ to the current relay chain and the beacon chain.

Preferably, step S201 further includes the following steps:

S201a, when the beacon chain generates the beacon block $B_b$, recording all the relay blocks $B_r$ processed by the beacon block $B_b$ to form a second block record {HBR}; and S201b, packing the second block record {HBR} and the hash set Hs into the beacon block $B_b$ corresponding to the beacon chain, and after the beacon block $B_b$ is validated by a consensus, sending the beacon block $B_b$ to the beacon chain and all the relay chains.

Preferably, step S202 further includes the following steps:

S202a, with respect to each relay chain, when generating the relay block $B_r'$, recording the beacon block $B_b$ processed by the relay block $B_r'$ to form a third block record {HBB}; and S202b, packing the third block record {HBB}, the first block record {HB} and the hash values h' into the relay block $B_r'$, and after the relay block $B_r'$ is validated by a consensus, sending the relay block $B_r'$ to all the shard chains managed by the current relay chain.

Preferably, in step S202, the D primitive set ch' and the hash values h' corresponding to the D primitive set ch' are obtained by the following steps:

extracting data containing the hash set Hg from the hash set Hs;

extracting all the D primitive sets ch from the extracted data containing the hash set Hg; and regrouping and combining all the D primitive sets ch to obtain the D primitive set ch' and the hash values h' corresponding to the D primitive set ch'.

The present invention further provides another technical solution as follows.

A device for blockchain full sharding based on a P2P storage network and a multi-layer architecture includes a memory and a processor that are communicatively connected, wherein a computer program is stored in the memory, and the processor is configured to execute the computer program to implement the method for the blockchain full sharding based on the P2P storage network and the multi-layer architecture.

The advantages of the present invention are as follows.

(1) The present invention provides a method and device for blockchain full sharding based on a P2P storage network and a multi-layer architecture. In the present invention, according to an address, the entire network blockchain nodes are divided into a shard chain, a relay chain and a beacon chain by means of network sharding, that is, shard cross-chain communication is realized by using a beacon-relay-shard three-layer architecture, so that the network requirement of the nodes has a linear relationship with the total number of TPS of the network.

(2) In the present invention, a transaction is divided into a W primitive and a D primitive. The W primitive is the digital asset deduction information of a payment account in the transaction T, and the D primitive is the digital asset addition information of a receiving account in the transaction T. The D primitives are grouped and the hash values corresponding to the D primitives are calculated, and the essence thereof is that: the W primitive is executed on an initiator's shard, the D primitive is stored in the P2P storage network, and the hash values corresponding to the D primitive will be communicated across the chain, and then executed on a receiver's shard.

By means of the above design, through the P2P storage network, a large amount of data only needs to be subjected to cross-chain communication through hash values of the data, thereby reducing communication complexity and bandwidth requirements, and greatly improving the scalability of blockchain sharding technology.

BRIEF DESCRIPTION OF THE DRAWINGS

In order to explain the embodiments of the present invention or the technical solutions in the prior art more clearly, the drawings used in the description of the embodiments or the prior art are briefly introduced below. Obviously, the drawings in the following description are only some embodiments of the present invention. For those skilled in the art, other drawings can be obtained based on these drawings without creative efforts.

DETAILED DESCRIPTION OF THE EMBODIMENTS

The present invention will be further described below in conjunction with specific embodiments. It should be noted that the description of these embodiments is used to facilitate understanding the present invention, but does not constitute a limitation to the present invention.

The term "and/or" herein is only an association relationship that describes the associated objects, indicating that there can be three relationships, for example, A and/or B, which can mean: A alone exists, B alone exists, and A and B exist at the same time. The term "/ and" herein describes another relationship of associated objects, which means that there can be two relationships, for example, A/ and B, which can mean: A alone exists, or A and B exist alone. In addition, the character "/" herein generally indicates that the associated objects before and after are in an "or" relationship.

Embodiment 1

As shown in FIGS. 1-4, the present invention provides a method for blockchain full sharding based on a P2P storage network and a multi-layer architecture, including a cross-shard transaction packing phase and a cross-shard transaction unpacking phase.

Figure 1:
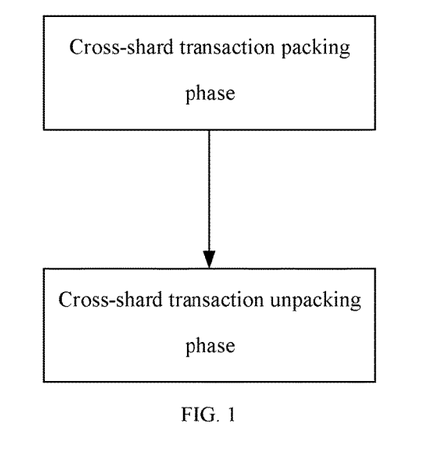
FIG. 1 is a schematic flow chart of the steps of the method for blockchain full sharding based on a P2P storage network and a multi-layer architecture according to the present invention.
Figure 3:
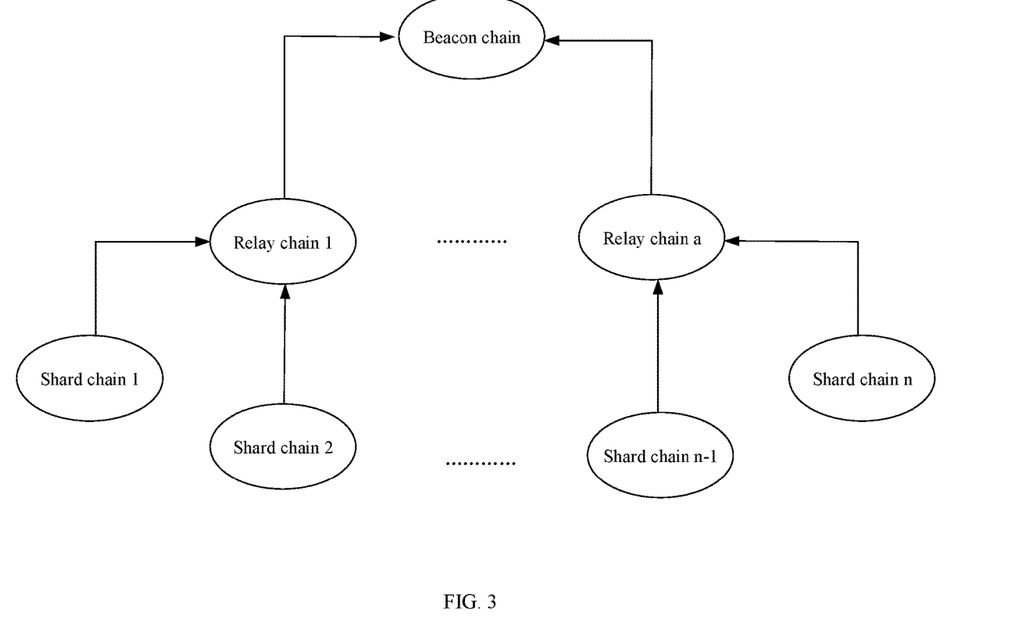
FIG. 3 is a schematic diagram of the transmission of the cross-shard transaction packing phase according to the present invention.

The step process of the cross-shard transaction packing phase is described in detail below.

Figure 2:
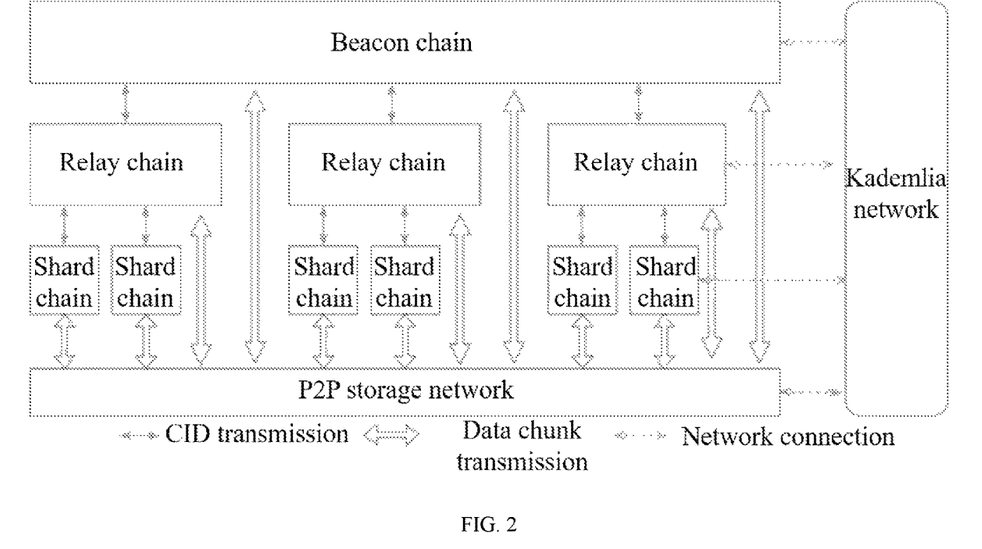
FIG. 2 is a schematic diagram of the communication structure of the shard chain, the relay chain and the beacon chain according to the present invention.

Transaction packing is the process of issuing transactions:

The cross-shard transaction packing phase includes the following steps:

First of all, in the present embodiment, transaction sharding is realized by using a multi-layer architecture, thereby making the blockchain linearly scalable. Within the allowed size range of the block, the total number of shards of the blockchain system is expanded from tens to thousands. The specific method for establishing the multi-layer architecture includes:

S101, network sharding is performed on the entire network blockchain nodes according to an address to obtain a shard chain, a relay chain, and a beacon chain respectively, wherein the beacon chain is communicatively connected to a plurality of relay chains, the relay chain is communicatively connected to a plurality of shard chains, and the shard chain is communicatively connected to a plurality of blockchain nodes.

In the present embodiment, the three-layer sharding architecture is divided according to the addresses of the blockchain nodes, that is, the entire network blockchain nodes are divided through network sharding to form a shard chain-relay chain-beacon chain three-layer architecture.

As shown in FIG. 2, FIG. 2 clearly shows the size relationship and communication relationship between the shard chain, the relay chain and the beacon chain.

In the present embodiment, one beacon chain can manage multiple relay chains, one relay chain can manage multiple shard chains, and one shard chain can manage multiple blockchain nodes.

After the three-layer sharding architecture is established, transaction sharding is also performed in the present embodiment, that is, step S102.

S102: a transaction T is decomposed into two primitives to obtain T={W,D}, wherein the W primitive is the digital asset deduction information of the payment account in the transaction, and the D primitive is the digital asset addition information of the receiving account in the transaction.

In the present embodiment, decomposing a transaction into a W primitive and a D primitive is to divide the transaction into a transaction sender and a transaction receiver. In the present embodiment, only the information received by the transaction receiver will be transmitted across the chain. Namely, only the D primitive will be transmitted across the chain and executed on the transaction receiver, that is, executed on the receiver's shard chain.

A large number of transactions in the blockchain generate a large amount of data. If the information on all transaction receivers, that is, the D primitives, is transmitted across the chain, the complexity of communication is increased and the requirements for network bandwidth are high, which cannot achieve high scalability of sharding. In this regard, in the present embodiment, the following changes are made to the cross-chain transmission of primitives, specifically including step S103 to step S105.

S103: with respect to each shard chain, the D primitives corresponding to all the transactions in each shard chain are counted, and all the D primitives in each shard chain are grouped; after the grouping is completed, a D primitive set ch corresponding to each group is obtained, the D primitive set ch corresponding to each group is stored into the P2P storage network, and then the hash set Hg corresponding to each D primitive set ch is calculated.

S104: with respect to each shard chain, when generating a shard block $B_s$, each hash set Hg is packed into a shard block $B_s$ corresponding to each hash set Hg, and the shard block $B_s$ is sent to all blockchain nodes in the shard chain and a relay chain to which the shard chain belongs.

In the present embodiment, only the hash value of each D primitive is transmitted across the chain, and the D primitive itself is stored in the P2P storage network. The specific process is described as follows:

First of all, since one relay chain manages multiple shard chains, and there will be transactions in each shard chain, it is necessary to count the D primitives of the transactions in each shard chain and group the D primitives to obtain the hash values corresponding to all D primitives in each group, to form a hash set Hg of each group of D primitives.

In the present embodiment, the D primitive sets ch can be obtained by grouping, that is, each D primitive set ch includes multiple D primitives, the multiple D primitive sets ch obtained by grouping can be stored in the P2P storage network, and the hash set Hg corresponding to each D primitive set ch will be subjected to cross-chain communication and sent to the receiver's shard chain for transactions.

In the present embodiment, a condition for grouping all the D primitives in each shard chain in step S103 includes: according to the relay chain corresponding to the receiving account in the D primitive, grouping the D primitives corresponding to the receiving accounts belonging to the same relay chain into one group.

The essence of the above grouping standard is to determine which blockchain node each D primitive is sent to. Since the D primitive is the digital asset addition information of the receiving account in the transaction T, the receiving node address can be obtained according to the receiving account, and then the receiving blockchain node can be obtained accordingly. According to the receiving blockchain node, it is determined which shard chain the receiving account belongs to, then it is determined which relay chain the receiving account is managed by. The D primitives managed by the same relay chain are grouped into one group to obtain the D primitive set ch, and the D primitive set ch is stored on the P2P network.

After each D primitive set ch is obtained, the hash value of each D primitive in each D primitive set ch is calculated according to a hash function, and then the hash set Hg of each D primitive set ch is obtained, so as to pack the hash set Hg into the shard block $B_s$ corresponding to the shard chain to which the D primitive belongs, and send the shard block $B_s$ to the relay chain for cross-chain transmission.

In the present embodiment, the hash set Hg is packed into the shard block $B_s$, that is, the shard block $B_s$ corresponding to the shard chain to which the D primitive belongs, that is, the block corresponding to the receiver's blockchain node.

In the present embodiment, the hash value is calculated by using a hash function, which is an existing function.

In the present embodiment, before step S104, the method further includes the following steps:

with respect to each shard chain, the state of each shard chain is updated according to the W primitives in each shard chain, and the state Merkle tree root $R_{shard}$ corresponding to each shard chain is obtained.

In the present embodiment, through the W primitive, that is, according to the digital asset deduction information of the receiving account in the transaction T, the state Merkle tree root $R_{shard}$ corresponding to each shard chain is obtained. The essence thereof is as follows: the sending transaction record on each shard chain is recorded, and meanwhile, the state Merkle tree root $R_{shard}$ must be packed together with the hash set Hg into a block and then uploaded to the relay chain. The specific steps are as follows.

In step S104, the state Merkle tree root $R_{shard}$ corresponding to each shard chain is packed into the shard block $B_s$ corresponding to the state Merkle tree root $R_{shard}$, and the shard block $B_s$ together with the hash set Hg, after being validated by a consensus, are sent to all the blockchain nodes in the shard chain and the relay chain to which the shard chain belongs.

By means of the above design, based on the state Merkle tree root $R_{shard}$ of each shard chain, that is, based on the transaction sending records in each shard chain, transaction verification can be performed to ensure transaction reliability.

After uploading the state Merkle tree root $R_{shard}$ and the hash set Hg to the relay chain, step S105 is performed as follows:

S105: with respect to each relay chain, when generating a relay block $B_r$, according to all the received shard blocks $B_s$, the hash sets Hg in all shard blocks $B_s$ are integrated according to all the relay chains to obtain the hash set Hr, the hash set Hr is packed into the relay block $B_r$, the hash sets Hg in all the shard blocks $B_s$ are stored into the P2P storage network, and then the relay block $B_r$ is sent to the current relay chain and the beacon chain.

As explained above, since a relay chain manages multiple shard chains, a relay chain will receive the shard blocks $B_s$ uploaded by all shard chains managed by the relay chain. The hash sets Hg of each shard block $B_s$ are integrated to obtain the hash set Hr. The essence of the integration includes: extracting the hash sets Hg in each shard block $B_s$, extracting the hash values contained in each hash set Hg, and integrating the extracted hash values into a hash set Hr.

In the present embodiment, the hash sets Hg in all the shard blocks $B_s$ are stored in the P2P storage network for data storage to ensure that the data will not be lost.

In addition, step S105 further includes the following steps:

S105a, with respect to each relay chain, when generating the relay block $B_r$, all the shard blocks $B_s$ processed by the relay block $B_r$ are recorded to form a first block record {HB}; and S105b, the first block record {HB} and the hash set Hr are packed into the relay block $B_r$ corresponding to the relay chain, and the relay block $B_r$, after being validated by a consensus, is sent to the current relay chain and the beacon chain.

Step S105a and step S105b are used to record data, that is, to record the information on all the shard blocks $B_s$ processed by the relay block $B_r$ as the first block record {HB} and save the first block record {HB} in the relay block $B_r$ for cross-chain transmission, thereby preventing data loss, facilitating data verification, and increasing the reliability and security of sharding.

Step S101 to step S105 and the sub-steps contained in each step are the process of the cross-shard transaction packing phase. FIG. 3 is a schematic diagram of the transmission of the cross-shard transaction packing phase, that is, the transmission process of the hash set Hg and the hash set Hr in the shard chain, the relay chain and the beacon chain.

Figure 4:
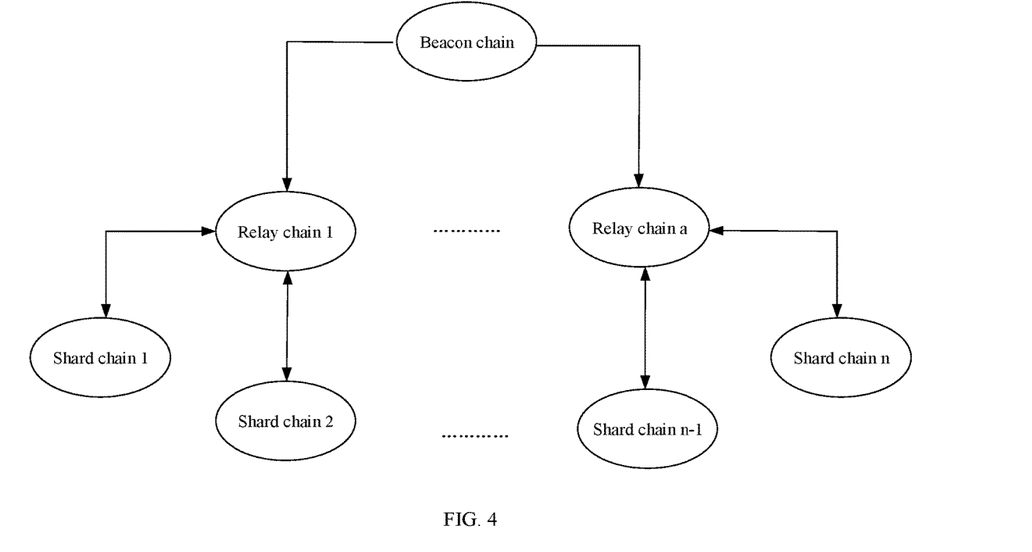
FIG. 4 is a schematic diagram of the transmission of the cross-shard transaction unpacking phase according to the present invention.

After the cross-shard transaction packing phase is completed, the cross-shard transaction unpacking phase is entered, that is, the transaction enters the execution process of the receiving shard chain, which is described specifically as follows.

The cross-shard transaction unpacking phase includes the following steps:

S201: when the beacon chain generates the beacon block $B_b$, according to all the received relay blocks $B_r$, the hash sets Hr in all the relay blocks $B_r$ are integrated according to all the relay chains to obtain the hash set Hs, the hash set Hs is packed into the beacon block $B_b$, the hash sets Hr in all the relay blocks $B_r$ are stored into the P2P storage network, and then the beacon block $B_b$ is sent to the beacon chain and all relay chains.

Step S201 is the process of integrating the hash sets Hr sent by the relay chain, and the integration process is the same as the integration process in step S105 in principle, which also includes: extracting the hash sets Hr in each shard block $B_r$ first, and extracting the hash values contained in each hash set Hr, then integrating the extracted hash values into a hash set Hs.

Meanwhile, the hash sets Hr in all shard blocks $B_r$ are also stored in the P2P storage network for data storage to ensure that the data will not be lost.

In addition, step S201 further includes the following steps:

S201a, when the beacon chain generates the beacon block $B_b$, all the relay blocks $B_r$ processed by the beacon block $B_b$ are recorded to form a second block record {HBR}; and S201b, the second block record {HBR} and the hash set Hs are packed into the beacon block $B_b$ corresponding to the beacon chain, and the beacon block $B_b$, after being validated by a consensus, is sent to the beacon chain and all the relay chains.

In the beacon chain, step S201a and step S201b have the same self-effects as recording in the relay chain, both of which are intended to prevent data loss, facilitate data verification, and increase the reliability and security of sharding.

In the cross-shard transaction packing phase, transaction information is sent to the blockchain node where the D primitive is located. On the contrary, in the cross-shard transaction unpacking phase, transaction information is sent from the beacon chain to the relay chain, and finally to the shard chain. Step S201 is the sending process from the beacon chain to the relay chain, while step S202 is the sending process from the relay chain to all the shard chains managed by the relay chain, which is specifically described as follows.

S202: with respect to each relay chain, when generating a relay block $B_r'$, according to the hash set Hs in the received beacon block $B_b$, through data inference, each D primitive set ch is regrouped and combined to obtain the D primitive set ch' belonging to the current relay chain and all hash values h' corresponding to the D primitive set ch', the D primitive set ch' is stored into the P2P storage network, all the hash values h' are packed into the relay block $B_r'$, and then the relay block $B_r'$ is sent to all the shard chains managed by the current relay chain.

Step S202 is a process of obtaining the D primitive set ch' belonging to the current relay chain and all hash values h' corresponding to the D primitive set ch' through the hash set Hs, and obtaining the D primitives through the hash values h' for updating the shard state.

Specifically, in step S202, the D primitive set ch' and hash values h' corresponding to the D primitive set ch' are calculated by the following steps:

the data containing the hash set Hg is extracted from the hash set Hs;

all D primitive sets ch are extracted from the extracted data containing the hash set Hg; and all the D primitive sets ch are regrouped and combined to obtain the D primitive set ch' and hash values h' corresponding to the D primitive set ch'.

Therefore, the hash set Hg can be obtained through the hash values in the hash set Hs, and then the D primitive set ch can be obtained according to the hash values in the hash set Hg, and finally the D primitive set ch' and the hash values h' corresponding to the D primitive set ch' can be obtained by regrouping and combining the D primitive set ch.

Certainly, a D primitive set ch' contains multiple hash values h'.

In the present embodiment, the relay block $B_r'$, and the relay block $B_r$ belong to the same relay block.

After each shard chain receives the information sent by the relay chain, the D primitive is extracted based on the hash values h'. The specific process includes:

S203: with respect to each shard chain, when generating a shard block $B_s'$, the D primitive set ch' that needs to be executed by the current shard chain in the P2P storage network is read according to the hash values h' in the received relay block $B_r'$, to obtain the D primitive, and then the shard state is updated according to the D primitive.

Since in step S202, the D primitive set ch' has been stored in the P2P storage network, and the D primitive set ch' is obtained by regrouping and combining the D primitive set ch, the corresponding D primitive set ch' can be matched according to the hash values h' to obtain the D primitive set ch contained in the D primitive set ch', so as to obtain the D primitives in the D primitive set ch for updating the data of this transaction.

Similarly, the shard block $B_s'$ and the shard block $B_s$ belong to the same shard block.

In addition, step S202 further includes the following steps:

S202a, with respect to each relay chain, when generating the relay block $B_r'$, the beacon block $B_b$ processed by the relay block $B_r'$ is recorded to form a third block record {HBB}; and S202b, the third block record {HBB}, the first block record {HB} and the hash values h' are packed into the relay block $B_r'$, and the relay block $B_r'$, after being validated by a consensus, is sent to all the shard chains managed by the current relay chain.

Step S202a and step S202b are also used to achieve data recording, prevent data loss, facilitate data verification and increase the reliability and security of sharding.

Through the above explanation, steps S201 to S203 are the process of sending transaction information to the receiving shard chain. FIG. 4 clearly shows the process of data transmission.

In the present embodiment, the scalability of the three-layer architecture system is specifically described as follows.

Scalability Theorem:

The communication bandwidth requirement of a shard system with an L (L>1)-layer architecture is as follows:

$$O\left(K^{\frac{2}{L-1}}\right).$$

Proof: a shard system with an L-layer architecture is examined. Without loss of generality, assume that an upper-layer shard manages m lower-layer shards, then the TPS in the system is: $K=m^{L-1}$, for any intermediate layer I, the data to be received is:

(1) m block data obtained from the m lower-layer shards, wherein each block data has a Merkle tree:

$$\{H|\langle H_1| \ldots |H_m\rangle\}^{*^j};$$

thus, the optimal communication is $32*m(m+1)$, wherein 32 is the length of the hash result.

(2) The blocks generated by this shard are:

$$\{\dot{H}|\langle \dot{H}_1| \ldots |\dot{H}_m\rangle\}^{*^j};$$

wherein $\dot{H}_i$ is the data hash value of the previous layer of cross-shard transactions, and the corresponding data is the data in (1), then the amount of data is $32*(m+1)$.

(3) The blocks generated by the corresponding shards in the previous layer are:

$$:\{\ddot{H}|\langle \ddot{H}_1| \ldots |\ddot{H}_m\rangle\}^{*^j};$$

wherein $\ddot{H}_i$ is the hash value of the cross-shard transaction data that is required by the current layer and informed by the shard of the previous layer, and the shard needs to take out the corresponding data, then the amount of the data is $32*(m+1)+32m$. Thus, under the optimal communication, the bandwidth requirement of the intermediate layer is:

$S=32*m(m+1)+32*(m+1)+32*(m+1)+32m.$

Therefore, $S \in O(32m^2)$, and $K=m^{L-1}$, then $$S \in O\left(K^{\frac{2}{L-1}}\right).$$

Thus, linear scalability can be realized by using a three-layer architecture, and super-linear scalability can be realized by using an architecture with more than three layers, which can further reduce the bandwidth requirements for cross-shard communication, but the complexity of the communication will increase accordingly.

In the present embodiment, it is only necessary to generate a hash value for the data transmitted across the chain, the original data is stored in the P2P network, and the hash value is transmitted through the chain. In this regard, the network has an architecture with at least three layers.

In summary, by using the method and device for blockchain full sharding based on the P2P storage network and the multi-layer architecture according to the present embodiment, the present invention has the following technical effects.

(1) The present invention provides a method and device for blockchain full sharding based on a P2P storage network and a multi-layer architecture. In the present invention, according to an address, the entire network blockchain nodes are divided into a shard chain, a relay chain and a beacon chain by means of network sharding, that is, shard cross-chain communication is realized by using a beacon-relay-shard three-layer architecture, so that the network requirement of the nodes has a linear relationship with the total number of TPS of the network.

(2) In the present invention, a transaction is divided into a W primitive and a D primitive. The W primitive is the digital asset deduction information of a payment account in the transaction T, and the D primitive is the digital asset addition information of a receiving account in the transaction T. The D primitives are grouped and the hash values corresponding to the D primitives are calculated, and the essence thereof is that: the W primitive is executed on an initiator's shard, the D primitive is stored in the P2P storage network, and the hash values corresponding to the D primitive will be communicated across the chain, and then executed on a receiver's shard.

By means of the above design, through the P2P storage network, a large amount of data only needs to be subjected to cross-chain communication through hash values of the data, thereby reducing communication complexity and bandwidth requirements, and greatly improving the scalability of blockchain sharding technology.

Embodiment 2

Figure 5:
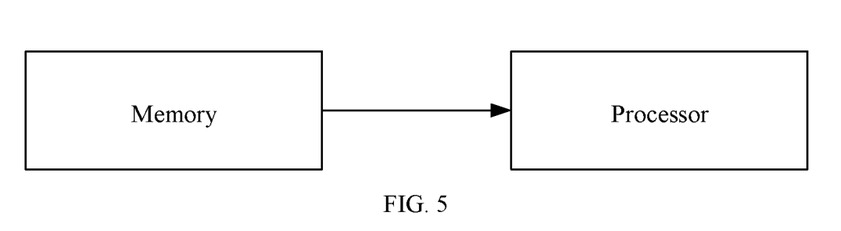
FIG. 5 is a structural schematic diagram of the device for blockchain full sharding based on a P2P storage network and a multi-layer architecture according to the present invention.

As shown in FIG. 5, the present embodiment provides a device for blockchain full sharding based on a P2P storage network and a multi-layer architecture, including a memory and a processor that are communicatively connected, wherein a computer program is stored in the memory, and the processor is configured to execute the computer program to implement the method for blockchain full sharding based on the P2P storage network and the multi-layer architecture of Embodiment 1.

The working process and technical effects achieved in the present embodiment are the same as those in Embodiment 1 and thus are not elaborated here.

The present invention is not limited to the above-mentioned optional embodiments. Anyone can derive other products in various forms under the motivation of the present invention, but regardless of any changes in its shape or architecture, all technical solutions falling within the scope defined by the claims of the present invention shall fall within the scope of protection of the present invention.

What is claimed is:

1. A method for blockchain full sharding based on a peer-to-peer (P2P) storage network and a multi-layer architecture, comprising a cross-shard transaction packing phase and a cross-shard transaction unpacking phase;

wherein the cross-shard transaction packing phase comprises the following steps:

S101: performing network sharding on network blockchain nodes according to an address to obtain a plurality of shard chains, a plurality of relay chains, and a beacon chain, respectively, wherein the beacon chain is communicatively connected to the plurality of relay chains, each relay chain of the plurality of relay chains is communicatively connected the plurality of shard chains, and each shard chain of the plurality of shard chains is communicatively connected a plurality of blockchain nodes;

S102: decomposing each of transactions T into W primitives and D primitives to obtain T={W,D}, wherein the W primitives are digital asset deduction information of payment accounts in the transactions T, and the D primitives are digital asset addition information of receiving accounts in the transactions T;

S103: with respect to the each shard chain, counting the D primitives corresponding to the transactions T in the each shard chain, and grouping the D primitives in the each shard chain; after the D primitives are grouped, obtaining D primitive sets ch corresponding to a plurality of groups, storing the D primitive sets ch corresponding to the plurality of groups into the P2P storage network, and then calculating hash sets Hg corresponding to the plurality of D primitive sets ch;

S104: with respect to the each shard chain, when generating shard blocks $B_s$, packing the hash sets Hg into the shard blocks $B_s$ corresponding to the hash sets Hg, and sending the shard blocks $B_s$ to the plurality of blockchain nodes in the each shard chain and a relay chain of the plurality of relay chains, wherein the each shard chain belongs to the relay chain; and S105: with respect to each relay chain of the plurality of relay chains, when generating relay blocks $B_r$, according to the shard blocks $B_s$, integrating the hash sets Hg in the shard blocks $B_s$ according to the plurality of relay chains to obtain hash sets Hr, packing the hash sets Hr into the relay blocks $B_r$, storing the hash sets Hg in the shard blocks $B_s$ into the P2P storage network, and then sending the relay blocks $B_r$ to the relay chain and the beacon chain;

the cross-shard transaction unpacking phase comprises the following steps:

S201: when the beacon chain generates beacon blocks $B_b$, according to the relay blocks $B_r$, integrating the hash sets Hr in the relay blocks $B_r$ according to the plurality of relay chains to obtain hash sets Hs, packing the hash sets Hs into the beacon blocks $B_b$, storing the hash sets Hr in the relay blocks $B_r$ into the P2P storage network, and then sending the beacon blocks $B_b$ to the beacon chain and the plurality of relay chains;

S202: with respect to the each relay chain, when generating relay blocks $B_r'$, according to the hash sets HS in the beacon blocks $B_b$, through data inference, regrouping and combining the D primitive sets ch to obtain D primitive sets ch' belonging to the relay chain and hash values h' corresponding to the D primitive sets ch', storing the D primitive sets ch' into the P2P storage network, packing the hash values h' into the relay blocks $B_r'$, and then sending the relay blocks $B_r'$ to the each shard chain managed by the relay chain; and S203: with respect to the each shard chain, when generating shard blocks $B_s'$, reading the D primitive sets ch' to be executed by the each shard chain in the P2P storage network according to the hash values h' in the relay blocks $B_r'$, to obtain the D primitives, and then updating a shard state according to the D primitives.

2. The method according to claim 1, wherein, a condition for grouping the D primitives in the each shard chain in step S103 comprises: according to a relay chain corresponding to the receiving accounts in the D primitives, grouping the D primitives corresponding to the receiving accounts belonging to the relay chain into one group.

3. The method according to claim 1, wherein, before step S104, the method further comprises the following steps:

with respect to the each shard chain, updating a state of the each shard chain according to the W primitives in the each shard chain, and obtaining a state Merkle tree root $R_{shard}$ corresponding to the each shard chain.

4. The method according to claim 3, wherein,
in step S104, the state Merkle tree root $R_{shard}$ corresponding to the each shard chain is packed into the shard blocks $B_s$ corresponding to the state Merkle tree root $R_{shard}$, and the shard blocks $B_s$ together with the hash sets Hg, after being validated by a consensus, are sent to the plurality of blockchain nodes in the each shard chain and the relay chain, and the each shard chain belongs to the relay chain.

5. The method according to claim 4, wherein,
step S105 further comprises the following steps:
S105a, with respect to the each relay chain, when generating the relay blocks $B_r$, recording the shard blocks $B_s$ processed by the relay blocks $B_r$ to form a first block record {HB}; and
S105b, packing the first block record {HB} and the hash sets Hr into the relay blocks $B_r$ corresponding to the relay chain, and after the relay blocks $B_r$ are validated by the consensus, sending the relay blocks $B_r$ to the relay chain and the beacon chain.

6. The method according to claim 5, wherein,
step S201 further comprises the following steps:
S201a, when the beacon chain generates the beacon blocks $B_b$, recording the relay blocks $B_r$ processed by the beacon blocks $B_b$ to form a second block record {HBR}; and
S201b, packing the second block record {HBR} and the hash sets Hs into the beacon blocks $B_b$ corresponding to the beacon chain, and after the beacon blocks $B_b$ are validated by the consensus, sending the beacon blocks $B_b$ to the beacon chain and the plurality of relay chains.

7. The method according to claim 6, wherein,
step S202 further comprises the following steps:
S202a, with respect to the each relay chain, when generating the relay blocks $B_r'$, recording the beacon blocks $B_b$ processed by the relay blocks $B_r'$, to form a third block record {HBB}; and
S202b, packing the third block record {HBB}, the first block record {HB} and the hash values h' into the relay blocks $B_r'$, and after the relay blocks $B_r'$ are validated by the consensus, sending the relay blocks $B_r'$ to the each shard chain managed by the relay chain.

8. The method according to claim 7, wherein,
in step S202, the D primitive sets ch' and the hash values h' corresponding to the D primitive sets ch' are obtained by the following steps:
extracting data containing the hash sets Hg from the hash sets Hs;
extracting the D primitive sets ch from the data containing the hash sets Hg; and
regrouping and combining the D primitive sets ch to obtain the D primitive sets ch' and the hash values h' corresponding to the D primitive sets ch'.

9. A device for blockchain full sharding based on a P2P storage network and a multi-layer architecture, comprising a memory and a processor; wherein the memory and the processor are communicatively connected, a computer program is stored in the memory, and the processor is configured to execute the computer program to implement the method according to claim 1.

10. The device according to claim 9, wherein,
a condition for grouping the D primitives in the each shard chain in step S103 comprises: according to a relay chain corresponding to the receiving accounts in the D primitives, grouping the D primitives corresponding to the receiving accounts belonging to the relay chain into one group.

11. The device according to claim 9, wherein,
before step S104, the method further comprises the following steps:
with respect to the each shard chain, updating a state of the each shard chain according to the W primitives in the each shard chain, and obtaining a state Merkle tree root $R_{shard}$ corresponding to the each shard chain.

12. The device according to claim 11, wherein,
in step S104, the state Merkle tree root $R_{shard}$ corresponding to the each shard chain is packed into the shard blocks $B_s$ corresponding to the state Merkle tree root $R_{shard}$, and the shard blocks $B_s$ together with the hash sets Hg, after being validated by the consensus, are sent to the plurality of blockchain nodes in the each shard chain and the relay chain, and the each shard chain belongs to the relay chain.

13. The device according to claim 12, wherein,
step S105 further comprises the following steps:
S105a, with respect to the each relay chain, when generating the relay blocks $B_r$, recording the shard blocks $B_s$ processed by the relay blocks $B_r$ to form a first block record {HB}; and
S105b, packing the first block record {HB} and the hash sets Hr into the relay blocks $B_r$ corresponding to the relay chain, and after the relay blocks $B_r$ are validated by the consensus, sending the relay blocks $B_r$ to the relay chain and the beacon chain.

14. The device according to claim 13, wherein,
step S201 further comprises the following steps:
S201a, when the beacon chain generates the beacon blocks $B_b$, recording the relay blocks $B_r$ processed by the beacon blocks $B_b$ to form a second block record {HBR}; and
S201b, packing the second block record {HBR} and the hash sets Hs into the beacon blocks $B_b$ corresponding to the beacon chain, and after the beacon blocks $B_b$ are validated by the consensus, sending the beacon blocks $B_b$ to the beacon chain and the plurality of relay chains.

15. The device according to claim 14, wherein,
step S202 further comprises the following steps:
S202a, with respect to the each relay chain, when generating the relay blocks $B_r'$, recording the beacon blocks $B_b$ processed by the relay blocks $B_r'$ to form a third block record {HBB}; and
S202b, packing the third block record {HBB}, the first block record {HB} and the hash values h' into the relay blocks $B_r'$, and after the relay blocks $B_r'$ are validated by the consensus, sending the relay blocks $B_r'$, to the each shard chain managed by the relay chain.

16. The device according to claim 15, wherein,
in step S202, the D primitive sets ch' and the hash values h' corresponding to the D primitive sets ch' are obtained by the following steps:
extracting data containing the hash sets Hg from the hash sets Hs;
extracting the D primitive sets ch from the data containing the hash sets Hg; and
regrouping and combining the D primitive sets ch to obtain the D primitive sets ch' and the hash values h' corresponding to the D primitive sets ch'.

* * * * *